United States Patent [15] 3,673,288
Childs, Jr. [45] June 27, 1972

[54] MICROWAVE METHOD FOR TEMPERING TAR-BONDED REFRACTORY BRICKS

[72] Inventor: Edwin E. Childs, Jr., York, Pa.

[73] Assignee: Dolomite Brick Corporation of America, York, Pa.

[22] Filed: Sept. 17, 1970

[21] Appl. No.: 73,636

Related U.S. Application Data

[63] Continuation-in-part of Ser. No. 790,166, Jan. 9, 1969, abandoned.

[52] U.S. Cl. ................................. 264/25, 264/26, 264/29, 264/30
[51] Int. Cl. ................ H05b 9/00, C04b 33/32, C04b 35/02
[58] Field of Search .................... 106/56; 264/22, 25, 26, 27, 264/29, 30

[56] References Cited

UNITED STATES PATENTS

| | | | |
|---|---|---|---|
| 3,468,683 | 9/1969 | Montgomery | 106/56 |
| 3,519,517 | 7/1970 | Dench | 264/26 |
| 3,168,602 | 2/1965 | Davies et al. | 264/29 |
| 3,261,959 | 7/1966 | Connell et al. | 219/10.55 |
| 3,449,213 | 6/1969 | Knapp et al. | 219/10.55 |
| 3,368,010 | 2/1968 | Cummings, Sr. | 264/63 |

OTHER PUBLICATIONS

C. H. Will, "Plastics–Microwaves Pros and Cons," SPE Journal, November 1968, at 29–32

Primary Examiner—Julius Frome
Assistant Examiner—John H. Miller
Attorney—Bacon & Thomas

[57] ABSTRACT

Tar-bonded basic refractory articles such as tar-bonded bricks and the like, are heated to tempering temperatures by the application of microwave energy. Tempering may be completely or partially carried out by the microwave heating operation.

12 Claims, No Drawings

MICROWAVE METHOD FOR TEMPERING TAR-BONDED REFRACTORY BRICKS

This application is a continuation-in-part of my copending application Ser. No. 790,166 filed Jan. 9, 1969 and now abandoned.

BACKGROUND OF THE INVENTION

The present invention relates to the manufacture of basic refractory articles such as tar-bonded dead-burned dolomite, periclase and/or magnesite bricks. The usual manufacture of tar-bonded basic refractory brick involves the mixing of dead-burned refractory grains with hot pitch or tar, after which the mixture is maintained hot to insure adequate mobility of the material under pressure and then pressed into the desired shape. After pressing, the bricks are normally tempered by the application of heat at a relatively low temperature, i.e. below coking temperature.

The conventional tempering process is a heating cycle sometimes employed by refractory brick manufacturers to provide a high grade tar-bonded refractory brick which can then be subjected to a coking operation, usually after installation in a furnace, to provide a carbon bonded refractory furnace lining. The tempering is accomplished at temperatures substantially below coking temperatures, e.g. below about 700° F., at which at least the softer components of the tar or pitch appear to flow to some extent and cure by loss of volatile components to provide a harder and more uniform bond in the tempered product.

The tempering is normally accomplished in large gas-fired or electric resistance ovens. Heating to tempering temperature must be done slowly to avoid expansion, bloating, cracking, bulging, spalling, slumping, etc. of the article. Depending upon the type of oven and the type and size of brick employed, the conventional heat tempering may require 9 to 24 hours to conduct. Additionally, the heat tempering oven requires a large housing area.

Microwave energy has been utilized heretofore for certain types of heating operations, most frequently, in the processing of moisture-containing substances. As such energy penetrates dielectric materials and readily heats any water contained therein, microwave irradiation provides a rapid and efficient means for cooking foods, freeze drying foods and for drying of many other products such as paper, wood and the like. Microwave energy has also been used to cure certain thermosetting resins known to have high dielectric loss. Microwave heating is quite different from other forms of electric heating in that alternating current is not used and the frequencies, which are supplied by electronic equipment are in the megacycle range.

The microwave portion of the spectrum is from about 900 to 300,000 megocycles per second, corresponding to wave lengths of about 30 centimeters to 1 millimeter. The microwave range used commercially is about 900 to 25,000 megacycles per second. Microwave frequencies allocated by the Federal Communications Commission (F.C.C.) for industrial, scientific and medical applications (I.S.M.) are 915 MHz, 2,450 MHz, 5,800 MHz and 22,125 MHz. (Note: 1 MHz = 1 mega cycle per second or 1 million cycles per second). Equipment for 5,800 MHz and 22,125 MHz frequencies is at present very expensive, and therefore only the 915 MHz and 2,450 MHz units are considered economically practical at this time.

SUMMARY OF THE INVENTION

The present invention is based on the discovery that microwave energy in the 900 to 25,000 MHz range may be used in the tempering of tar-bonded refractory articles. Experiments have shown that both 915 MHz and 2,450 MHz units can be used to heat tar-bonded bricks. Of the two frequencies, the 2,450 MHz is more satisfactory although it is more expensive to purchase the equipment. At 2,450 MHz a faster heating rate may be obtained and a more uniform heating across the length and cross-section of the brick is provided. Also, at 2,450 MHz the tar content may be varied over a wider range than can be used in a 915 MHz unit. Successful tempering can be obtained in a 915 MHz unit if care is taken not to have tar contents above 4.5 percent and the cavity is carefully designed for proper absorption of energy by the load. It will be understood that further improvements may be obtainable above 2,450 MHz, the use of the higher frequencies being limited only by F.C.C. regulations and economics.

The microwave energy penetrates the mineral and creates vibrations within the molecules of the tar upon which it acts. These vibrations cause molecular or internal friction which heats the tar uniformly. Because of the uniformity of heating, the tar can be heated very rapidly without the formation of defects in the interior or at the exterior of the refractory body. Microwave tempering produces bricks with properties comparable to those found in bricks or other refractory articles tempered by conventional heating for much longer time periods. The microwaves energy can be applied directly to the refractory article and, consequently, energy is not lost by heating up the air or any parts of the oven housing.

In the case of tar-bonded basic refractory articles or bricks, the microwave energy acts only on the tar and not the stone. Unexpectedly, though only the tar is directly affected by the microwave energy and comprises a minor proportion of the mass, the entire brick can be uniformly and rapidly heated. Even though refractory bricks are not homogeneous, it has been found that the tar in the center of the brick can be heated at the same time as the tar on the outside of the brick. Because of this uniformity in heating, the volatiles can be released from the center of the brick and are not trapped in the interior by premature tempering of the outside of the brick. It has been found that the growth of the brick is minimized during tempering and the brick density thereby maintained.

DESCRIPTION OF THE PREFERRED EMBODIMENTS

Dead-burned dolomite, periclase or magnesite particles are sized into a mixture of suitable grain sizes by common screening procedures. Naturally the screen analysis of the mixture is selected to yield a dense mass substantially free of voids after compaction. For example, a suitable mixture for producing tar-bonded refractory brick would include:

| % by Weight of Aggregate | U.S. Standard Sieve No. |
| --- | --- |
| 60–85% | +60 |
| 15–40% | −60 |

The mixture of grains is preheated to a temperature of 300°–500° F. and blended with about 4 to 7 percent by weight of tar or pitch which has also been preheated to 300°–500° F. in order to achieve fluidity. The aggregate and binder may be mixed at a temperature below about 375° F. For bricks to be heated at 915 MHz a maximum of about 4.5 percent tar should be used in order to prevent growth of the brick, while for bricks heated at 2,450 MHz and above amounts up to 7 percent can be used. The blended mixture is then maintained at 300° F. or above in order to insure adequate mobility of the material under pressure. Formation of the hot mixture of aggregate and tar into bricks of the desired shapes is affected by pressing at high pressures ranging between 4 to 10 tons per square inch. Cold pressed bricks may be made by use of tar plus solvent oils to provide fluidity.

The work "tar" as used herein is intended to indicate petroleum base and coal tar base materials and to include pitch. It is used to designate the bonding material conventionally employed to produce a tar or pitch bonded basic refractory articles. Additives, such as carbon black, charcoal, graphite and the like may be included with the binder to increase the fixed carbon content. The bricks or other molded articles may be subjected to microwave heating while in warm condition from the pressing operation, e.g. 100°–300° F., or may be permitted to cool to room temperature and then heated by microwave energy, the only difference being a slightly longer time factor for heating in the latter instance. The pressed bricks may also be subjected to an oil dip after pressing and before heating with no adverse effects on the heating operation. Further, the microwave heating operation may be applied to formulations which have been bonded and pressed at ambient temperatures. For example, a tar-bonded brick can be made by using a powdered pitch with a solvent as the binder, and the pitch may be redistributed and the brick tempered in the subsequent microwave heating operation.

The tempering of tar-bonded refractory articles can best be accomplished by a combination of microwave heating and conventional heat tempering, e.g. in the conventional gas-fired or electric oven. It is understood, of course, that microwave tempering can be employed exclusively, the proper balance between microwave and conventional tempering being dependent on simple plant economics. The microwave tempering is best accomplished at about 600° F. although the invention is not limited to the use of this optimum and higher or lower temperatures e.g., in the range of about 400°–700° F., may be used. The overall tempering operation can best be accomplished by heating to about 600° F. in a microwave oven at a frequency of 2,450 MHz for approximately ½ hour followed by about 2 to 3 hours conventional heating at about the same temperature. The microwave oven can be of a batch or continuous type. These ovens are vented to the atmosphere so that the treatment takes place at substantially atmospheric pressure. The bricks can be heated on a stillage on wheels to about 600° F. in the microwave oven and then pushed into the tunnel oven for a soak of 2 to 3 hours at about 600° F. Other conveyor systems as known in the art may be used.

Microwave ovens of commercially available type can readily be adapted for carrying out the process of the present invention. These ovens are provided with microwave generators and appropriate wave guides, all as known in the art. They should be capable of generating energy in the 900 to 25,000 MHz range.

One oven used for testing was a small domestic type unit which provided microwave energy at about 2,450 MHz. This unit was of a type normally used to heat food in restaurants and had a power output of 2,000 watts. It was found that pieces of tar-bonded brick could be heated to 600° F. in about 20 minutes in this unit. Even with this short heating span, no deformation, cracking or other defects were noted. Less than half the expansion produced during a conventional tempering cycle was experienced from tempering in the microwave oven.

In addition to the test run at 2,450 MHz a separate series of tests were run in a unit having a 25-Kilowatt power source at 915 MHz frequency connected to a rectangular test cavity of approximately 10 cubic ft. capacity. These tests showed the tar-bonded bricks to heat uniformly and easily as long as the bricks were carefully oriented in the oven cavity and had no more than 4.5 percent tar content. All of the mixes heated uniformly and quickly. Growth was minimal except in one case where the tar content was over 6 percent. This brick bloated rather badly. A second batch of the same mix was made with 4.2 percent tar. Bricks from this mix with less tar did not bloat or grow at all when heated by 915 MHz microwaves.

Additional tests were run by heating full-sized tar-bonded bricks at a frequency of 2,450 MHz in a 3.2 Kilowatt test cavity powered by four 800-watt magnetrons. All of the bricks heated quickly with excellent uniformity throughout the brick mass, and confirmed earlier tests that indicated the advantage of using 2,450 MHz over 915 MHz.

Further testing showed that microwaves could be used for heating tar-bonded magnesite and periclase as well as tar-bonded dolomite bricks. These both heated at a similar rate to dolomite.

A fuel oil predip coating was found to have no significant effect on the heating of tar-bonded brick at either frequency.

Several types of cold mix bricks were prepared that contained no liquid pitch. These were made with various combinations of resins, carbon black, fuel oil and powered pitch. No difficulty was noted in heating, from room temperature, any of the bricks made with these various substances as binders or additions.

It has been determined that the constant power output of the microwave oven produces a heating rate which is dependent upon the mass of the brick being heated. Tests show that this is a straight line function within the power limit of the microwave oven.

It will be understood that the time period for the microwave heating step will vary to some extent depending on a number of factors, including the type of microwave equipment, the power output and the frequency used, the mass of the brick subjected to treatment, the composition of the brick, and the initial temperature of the brick being treated. Therefore, it is preferable that the time of microwave treatment be expressed functionally as that time required to raise the temperature of the tar-bonded article at least to tempering temperature e.g. in the 400°–700° F. range.

The expansion rate in the 3 inch dimension 6×6×3 inch test samples averaged about 0.5 percent. This expansion increase is less than experienced in conventional tempering operations. It represents a bulk density decrease after tempering of about 0.02gm/cc versus about 0.08gm/cc for conventional tempering operations. Bulk density is a very important property in a tar-bonded brick. It is generally recognized that a high bulk density imparts improved mechanical properties to the tar-bonded brick and thus improves the operating life of the brick in a steelmaking furnace.

Tempering tests on representative tar-bonded dolomite brick samples made in accordance with the general procedure set forth in the foregoing description, are shown below.

The tar-bonded refractory test bricks were placed on a metal rack supported by pieces of dry alumina brick. No metal can be allowed to touch the inside of a microwave oven chamber as it will cause severe arcing and possible damage to the oven. The tempered refractory articles were tested for coked M.O.R. (5 inch span on 2×3×6 inch piece), volatiles and retained carbon. All refractory articles were tempered by heating to 550°– to 600° F. on perforated metal racks in the microwave oven. Some of them were then placed into a conventional electric resistance heated oven at 550°–600° F. for the desired hold time. Test samples were cut out and tested according to standard test procedures.

TEST 1.

Four tar-bonded test bricks of 6×6×3 inch dimensions, (approximately 11 pounds) were made by mixing dead-burned preheated dolomite grain, preheated to 350° F., with 4.5 percent by weight of preheated pitch (375° F.) according to the general procedure described above. One percent of finely divided carbon, based on the weight of the aggregate was incorporated in the mix. The dolomite grain had the following size range:

U.S. Standard Sieve No.

| Mix 1. | | | | |
|---|---|---|---|---|
| | +¼ | — | | 0% |
| —¼ | +6 | — | | 43 |
| —6 | +18 | — | | 32 |
| —18 | +60 | — | | 9 |
| —60 | | — | | 16 |

These test bricks were hot pressed at about 300° F. under 6.7 tons/sq. in. pressure and were immediately placed in a 2-Kilowatt-2,450 MHz microwave oven as described above. They were brought to a tempering temperature of 550° F. in a time period of about 20 minutes. Three of the test bricks were given an additional tempering in a conventional electric resistance type furnace at a temperature of 550° F. for 2 hours, 4 hours and 5 hours, respectively.

TEST 2.

The procedure of Test 1 was repeated except that the tempering temperature was raised to 600° F.

TEST 3.

For comparative purposes, brick samples were made as in Test 1 and were subjected to tempering operations (without microwave heating) at 600° F. in an electrical resistance furnace for a period of 9 hours.

TEST 4.

A full sized brick (32.9 lbs.) was made by the procedure of Test 1 and was subjected to microwave heating at 2,450 MHz for a period of 110 minutes.

The results of the above tests are shown in Table I below.

TABLE I

| tempering temperature (°F) | microwave tempering time (min.) | conventional heat tempering time (hrs.) | coked M.O.R. (psi) | volatiles (%) | Retained Carbon (%) |
|---|---|---|---|---|---|
| Test 1 | | | | | |
| 550 | 20 | 0 | 655 | 2.04 | 3.39 |
| 550 | 20 | 2 | 342 | 1.64 | 3.46 |
| 550 | 20 | 4 | 774 | 2.25 | 3.38 |
| 550 | 20 | 5 | 640 | 2.15 | 3.14 |
| Test 2 | | | | | |
| 600 | 20 | 0 | 901 | 1.61 | 3.65 |
| 600 | 20 | 2 | 746 | 1.51 | 3.65 |
| 600 | 20 | 4 | 973 | 1.43 | 4.10 |
| 600 | 20 | 5 | — | 1.10 | 3.65 |
| Test 3 conventional heat tempering only | | | | | |
| 600 | 0 | 9 | 994 | 1.48 | 3.83 |
| Test 4 full sized brick (32.9 lbs.)— Microwave Tempering Only | | | | | |
| 600 | 110 | 0 | 943 | 1.65 | 3.42 |

Test 5.

Test 1 was repeated using dead-burned dolomite grain of different size ranges as follows:

U.S. Standard Sieve No.

| | | | | |
|---|---|---|---|---|
| Mix 2 | | +¼ | — | −13% |
| | −¼ | +6 | — | −19 |
| | −6 | +18 | — | −38 |
| | −18 | +60 | — | −14 |
| | −60 | | — | −16 |
| Mix 3 | | +¼ | — | 0% |
| | −¼ | +6 | — | 18 |
| | −6 | +18 | — | 46 |
| | −18 | +60 | — | 14 |
| | −60 | | — | 22 |
| Mix 4 | | +¼ | — | 28% |
| | −¼ | +6 | — | 18 |
| | −6 | +18 | — | 12 |
| | −18 | +60 | — | 2 |
| | −60 | | — | 40 |

Tar-bonded brick samples produced from each of these mixes were satisfactorily tempered by the microwave process. The differences in gradation had little effect upon the heat-treating characteristics.

TEST 6.

Another group of tar-bonded test bricks of 6×6×3 inch dimensions were made as in Test 1. Some of the bricks were given a predip in hot oil at about 160° F. and allowed to drain for 15 minutes before placing in the microwave oven. The oven was a 25-Kilowatt-915 MHz unit as described above. The test bricks were placed in the center of the cavity and elevated about ten inches off the base supports in the cavity. In this unit it was necessary to place the bricks perpendicular to the waves with the waves coming in underneath the bricks and not hitting them directly as they propagated from the waveguide. It was also found that a relatively low power setting was necessary with this microwave unit. With four bricks in the unit and with 6.5 to 8.0 KW power it required approximately 1 hour and 15 minutes to reach the desired tempering temperature of 550° to 600° F. as contrasted to about 20 minutes with the 2,450 MHz unit. Satisfactory tempering was attained at this tempering rate. As in the case of tempering at 2,450 MHz, improvements were attained by use of an additional tempering soak at 550°–600° F. for 2 to 5 hours in the conventional electric furnace.

Tar-bonded bricks using each of the stone mixes 1, 2, 3 and 4 were satisfactorily tested in the 915 MHz unit.

TEST 7.

Tar-bonded dolomite bricks prepared by the process of Test 1 were tested at 2,450 MHz in microwave oven having a 3.2 Kilowatt test cavity powered by four 800 watt magnetrons. The physical tests run on these bricks gave results at least equal to typical results from conventional tempered brick.

TEST 8.

Tar-bonded periclase and tar-bonded magnesite brick were subjected to microwave heating in the 915 MHz oven along with a tar-bonded dolomite brick. All of the bricks heated at a satisfactory rate and were satisfactorily tempered by the microwave process.

TEST 9.

Cold-pressed bricks were made from the following mixtures:
 a. Dead-burned dolomite grain
  1.5% Finely divided carbon (e.g. graphite, charcoal or carbon black)
  3.6 percent Transphalt L-4 (a low melting point petroleum hydrocarbon resin as described in Modern Plastics Encyclopedia (1957) page 104):
 b. Dead-burned dolomite grain
  2 percent powdered pitch
  3.5 percent liquid solvent oil (e.g. fuel oil) containing paraffin wax (amount up to solubility limit);
 c. Dead-burned dolomite grain
  1 percent finely divided carbon (e.g. graphite, charcoal or carbon black)
  3 percent liquid solvent oil (e.g. fuel oil), containing paraffin wax (amount up to solubility limit).

The aggregate and binder components were mixed at room temperature and were cold pressed. There is no necessity for heating for mixing or pressing when using these binder components or with similar binders which are relatively fluid or liquid at room temperatures.

The cold-pressed brick were then subjected to microwave heating at 915 MHz and it was found that they could be raised to tempering temperature of 550°–600° F. by this heating method to provide a satisfactory tempered product. Likewise tempering may be accomplished by using higher microwave frequencies and by use of combinations of microwave heating and conventional heating.

I claim:

1. In a method of manufacturing tar-bonded refractory shaped articles wherein refractory particles consisting essentially of dead-burned dolomite, periclase, magnesite or mixtures thereof are mixed with from about 4 to 7 percent by weight of a tar binder at a temperature below about 375° F., the mixture is pressed into desired shapes and the shaped articles are subjected to a tempering treatment below coking temperature of the tar prior to use, the improvement comprising raising the temperature of the shaped articles uniformly and rapidly throughout their entire mass to tempering temperature in the range of 400° to 700° F. by subjecting said articles to microwave energy in the range of about 900 to 25,000 megacycles per second the amount of tar binder being no more than about 4.5 percent when microwave energy of about 900 megacycles is used.

2. The method of claim 1 wherein the shaped articles are heated to a temperature of about 550° to 600° F. by the application of microwave energy.

3. The method of claim 2 wherein the shaped articles are subjected to microwave heating at a maximum temperature of about 600° F. for approximately 1/2 hour.

4. The method of claim 1 wherein the shaped articles are subjected to further tempering by the application of external heat following the initial microwave heating.

5. The method of claim 4 wherein the tempering is conducted at a temperature of about 600° F.

6. The method of claim 5 wherein the shaped articles are further heat tempered by the application of external heat for a period of about 2 to 3 hours.

7. The method of claim 1 wherein the microwave energy applied to said articles has a frequency of 2,450 megacycles per second.

8. The method of claim 1 wherein the amount of tar in said mixture is no more than about 4.5 percent, based on the weight of the mineral aggregate, and the microwave energy applied to said articles has a frequency of 915 megacycle per second.

9. In a method of manufacturing refractory shaped articles having a thermally decomposible hydrocarbon bond wherein refractory particles consisting essentially of dead-burned dolomite, periclase, magnesite or mixtures thereof are mixed at ambient temperature with from about 3 to 7 percent by weight of a hydrocarbonaceous binder that is liquid at ambient temperature consisting essentially of tar, low melting point petroleum hydrocarbon resins, solvent fuel oil containing paraffin wax, or mixtures thereof, the mixture is pressed into desired shapes and the shaped articles are subjected to a tempering treatment below coking temperature of the binder prior to use, the improvement comprising raising the temperature of the shaped articles uniformly and rapidly throughout their entire mass to tempering temperature in the range of 400° to 700° F. by subjecting said articles to microwave energy in the range of about 900 to 25,000 megacycles per second, the amount of binder being no more than about 4.5 percent when microwave energy of about 900 megacycles is used.

10. The method of claim 9 wherein the aggregate is mixed with a low melting point petroleum hydrocarbon resin and finely divided carbon.

11. The method of claim 9 wherein the aggregate is mixed with powdered pitch and a solvent fuel oil containing paraffin wax.

12. The method of claim 9 wherein the aggregate is mixed with a solvent fuel oil containing paraffin wax and with finely divided carbon.

* * * * *